United States Patent
Mueller

[15] 3,668,519
[45] June 6, 1972

[54] LUMINOUS AMMETER-VOLTMETER

[72] Inventor: George R. Mueller, South Milwaukee, Wis.

[73] Assignee: J. I. Case Company, Racine, Wis.

[22] Filed: Apr. 30, 1971

[21] Appl. No.: 138,929

[52] U.S. Cl. ..........................324/96, 324/15, 324/158 MG, 350/211
[51] Int. Cl. .......................................................G01r 31/00
[58] Field of Search ...............324/96, 15, 158 MG; 350/211; 240/8.1; 340/383

[56] References Cited

UNITED STATES PATENTS

| | | | |
|---|---|---|---|
| 3,425,056 | 1/1969 | Dawson | 340/383 |
| 2,841,768 | 7/1958 | Robinson | 324/158 MG |
| 3,363,175 | 1/1968 | Davis | 324/96 |

*Primary Examiner*—Rudolph V. Rolinec
*Assistant Examiner*—David M. Carter
*Attorney*—Arthur J. Hansmann

[57] ABSTRACT

A luminous ammeter-voltmeter of a type which is particularly useful in a vehicle which commonly has a relatively low voltage electric system. The system includes a battery, and a type of electric generating means, and an electric regulator and a gauge for indicating amperage and voltage in the system. The gauge is in the form of a light bulb connected in the system to emit light rays in proportion to the electric power in the system, and the light rays are directed to a refractor which receives the light rays in various areas of the refractor. The refractor areas are respectively spaced from the light bulb to thereby indicate the intensity of the light emitted from the bulb, by having the refractor areas respectively located in the high-intensity light-ray position or the low-intensity position, that is, either close to or farther from the light bulb. The refractor is provided with indicia for visibly disclosing the quantity of electric power in the system by having the respective areas of the refractor illuminated in the different intensities mentioned.

8 Claims, 3 Drawing Figures

PATENTED JUN 6 1972 3,668,519

INVENTOR:
GEORGE R. MUELLER

Arthur J. Hansmann
ATTORNEY

LUMINOUS AMMETER-VOLTMETER

This invention relates to a luminous ammeter-voltmeter, and, more particularly, it relates to a combined ammeter and voltmeter which is particularly useful in a vehicle of the type having a relatively low voltage electric system, such as commonly found in an automobile having a 6 or 12 volt system.

BACKGROUND OF THE INVENTION

The prior art is already aware of gauges or indicators which reveal the condition of electric circuits, such as the quantity of amperes and volts in the system. These indicators and gauges are commonly used in vehicles, such as automobiles, tractors, and the like which employ engines and electric systems. These indicators are commonly known in there types, namely, ammeters, voltmeters, and a warning lamp type which will indicate a charging or discharging condition in the electric system. For reasons of cost and simplicity of construction, the warning lamp is commonly used, however, the warning lamp is only a form of a voltmeter which is not intended to give any real indication of voltage in the system, and is certainly not accurate in indicating voltage. That is, all the warning lamp can do is increase or decrease in light ray emission, according to the voltage in the system, so the light simply becomes brighter or dimmer but it does not indicate any precision in quantity of volts.

That is, the prior art has employed gauges which include the pointer and dial type of gauges with their electric elements and wirings, but these gauges are expensive and are not of a durable nature, and even the accuracy of these gauges is not always good nor reliable. To solve some of the problems attending the dial and needle type of gauge, the prior art and the industry generally has resorted to the lamp type mentioned above, but that type has the shortcomings of being a type which is not at all intended to be accurate in its indications of amperage and voltage.

The present invention is the provision of a luminous ammeter-voltmeter which solves the aforementioned problems in that it provides an inexpensive, reliable and accurate type of instrument for indicating the quantity of amperes and volts in the system.

More specifically, the present invention is the provision of an inexpensive, reliable, and yet indicative type of instrument for visually showing the quantity of amperes and volts in an electric circuit. In accomplishing this and the other objects herein, the present invention utilizes the simplicity and reliability of a light bulb, and it also utilizes a refractor lens positioned in front of the light bulb with indicia thereon to indicate quantity of amperes and volts in the system. By this means, the advantages of both of the aforementioned devices is included in this system so that there is an inexpensive but yet accurately revealing instrument. No moving parts are employed in this invention, so this instrument remains accurate and reliable throughout its lifetime.

BRIEF DESCRIPTIONS OF THE DRAWINGS

DETAILED DESCRIPTION OF THE PREFERRED EMBODIMENT

Figure 1:
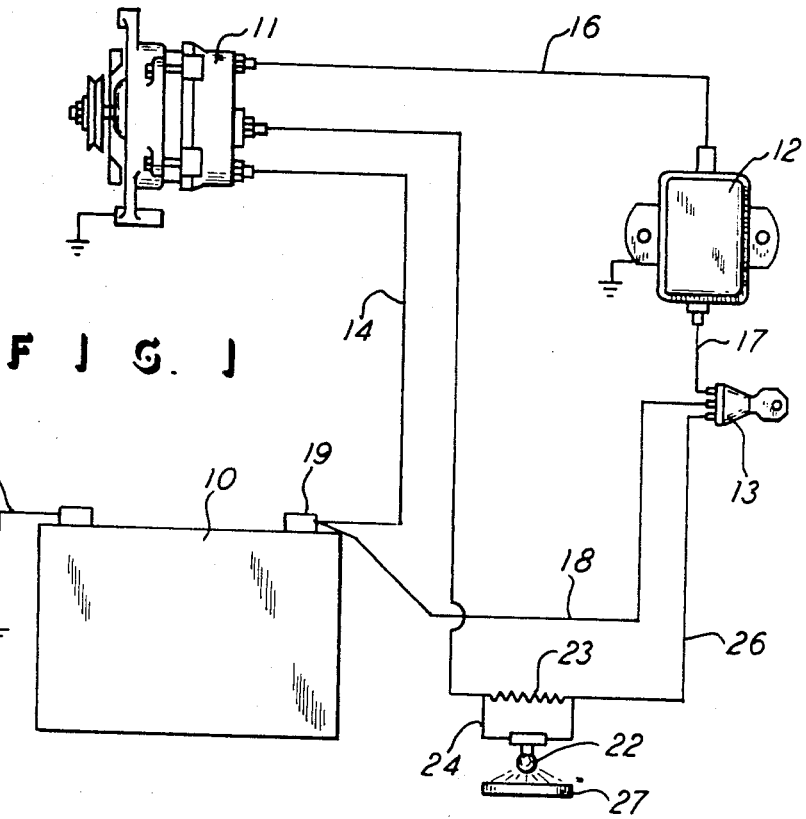
FIG. 1 is a schematic view of an electric circuit employing the instrument of this invention.

This invention has particular application to the electric circuits of vehicles, such as automobiles, tractors, and any other types of vehicles employing electric circuits. Accordingly, the invention is disclosed in that context, and FIG. 1 shows a conventional vehicle battery 10, a conventional generating means, such as the alternator 11, a voltage regulator 12, and a key operated electric switch 13. These several elements mentioned are electrically connected together by cables or wires 14, 16, 17 and 18, with the cables or wires 14 and 18 being connected to the positive battery post 19. The other battery post is schematically shown to be gounded through the connected cable 21, and the system thus described is all of a conventional nature and will be understood by one skilled in the art.

Figure 2:
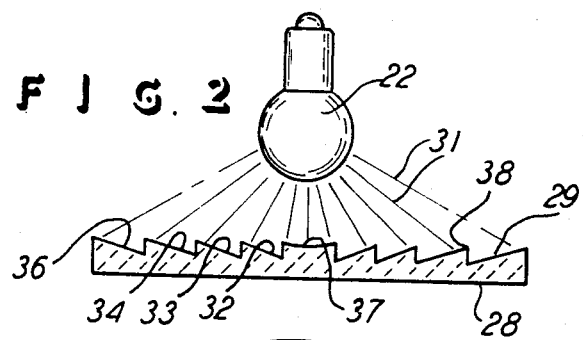
FIG. 2 is an enlarged view of the light bulb and a section through the refractor, both as seen in FIG. 1.

The instrument connected in the circuit to indicate the quantity of amperes and volts in the circuit is shown to be a lamp or light bulb 22 connected across a resistance wire 23 and connected by means of the wires 24 to a wire 26 extending from the switch 13 and to the alternator 11. Thus, with the electric circuit mentioned, the electric lamp 22 will either brighten or dim, that is it will take on a condition of brightness, according to the quantity of amperes in the system. To provide a visible indication of the amperes and volts in the system, a refractor 27 is positioned in front of the bulb 22 and is centered on the longitudinal axis of the bulb 22, as shown in FIGS. 1 and 2. Thus the refractor 27 is shown to be a circular piece having a flat or planar shape and having a flat front face 28 and a stepped or irregularly shaped rear face 29. The face 29 is exposed to the light bulb 22 so that the light rays, as indicated by the lines 31, emanating from the light bulb 22 will fall upon the refractor face 29. The face 29 is formed of a series of circular areas or rings 32, 33, 34 and 36, in addition to the center circular area 37. The rings 32 and the like are annular and have their faces directed toward the light bulb 22, and all of the ring faces are shown to be parallel to each other.

Figure 3:
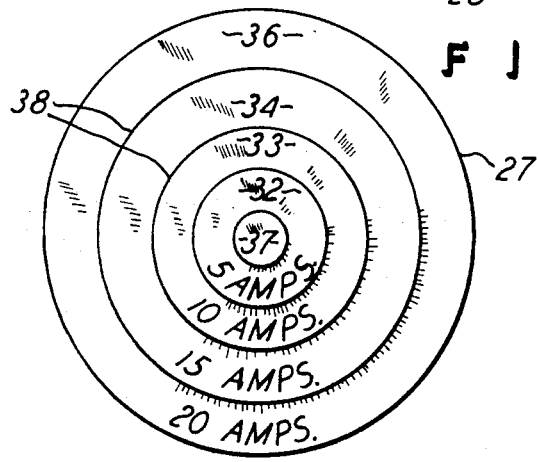
FIG. 3 is a plan view of the refractor of FIG. 1.

Thus it will be now understood that the center section of the refractor 27 receives the highest intensity of the light rays emitted from the light bulb 22, and the outer section of the refractor 27, such as the rings 34 and 36, receives the lowest intensity of the light rays. Thus, one viewing the refractor from the side or face 28 would immediately see the light through the refractor 27 and would find that the light is brightest at the center but dimmest at the outer edge of the refractor 27. According to the intensity of electric power in the system, the observer may be able to see light through only the center section 37, and this could indicate that the electric system is not sufficiently charging through the function of the alternator or generating means 11. If the electric system increased the electric power, then the first ring 32 may receive ample intensity of light to have the light show through the ring 32 and thereby indicate that some minimal quantity of amperes and volts exist in the system. As indicated in FIG. 3, the center section of the refractor 27 could be marked with indicia, such as the marking "5 AMPS" indicated in FIG. 3, and it will be understood that this indication would be on the refractor 27 so that one looking directly at the face 28 could read the message "5 AMPS". That is, the marking itself could be either on the back face 29, in which case it would be inverted from the marking as shown in FIG. 3, and it could be also on the front face 28, but in either event, it would be readable to the observer in a conventional way.

Of course if the intensity of the electric power increases in the circuit, then light rays from the light bulb 22 would be great enough to illuminate the outer rings 33 or 34 or 36, and, by virtue of the refractor or focusing characteristic of the member 27, the light rays would be intensified and clearly show through to the front face 28, and thereby indicate the illumination of that particular ring, according to the electric power in the system.

It will also be noted that the several rings described are concentric about the center of the refractor 27, and such center is on the line of the central axis extending through the light bulb 28, and that axis would be on the vertical as the light bulb is shown in FIGS. 1 and 2. Further, the central area 37 is shown to be concaved so that the center point of its concavity is the focal point of the light bulb 22 and thus the entire surface 37 is equidistantly spaced from the focal point of the light bulb 22 and thereby full surface 37 receives equal distribution of intensity of light rays. Due to the stepped arrangement of the back surface 29, the light rays striking the peaks 38 of each of the rings or annular surfaces will not pass to the next outer ring, and thus a clear demarcation of light intensity is achieved between adjacent rings and, in this manner, the refractor will in effect intensity the minor changes in the brilliance of the light bulb 22, according to the electric power in the circuit, all as desired in order to provide the accurate and reliable instrument which does not rely upon moving parts and expensive construction.

What is claimed is:

1. A luminous ammeter-voltmeter for use in an electric circuit, comprising a light bulb electrically connected in the electric circuit to respond to increases and decreases in voltage and amperage in the circuit by brightening and dimming according to the voltage and amperage, and a light ray refractor disposed adjacent said light bulb for receiving the light rays emanating from said light bulb, said refractor having a plurality of visibly distinguishable refractory areas located along the surface of said refractor and at different distances from said light bulb for separately receiving and focusing said light rays from said light bulb according to the intensity of said light rays falling on each of said refractory areas to thereby visibly indicate the voltage and amperage in said light bulb.

2. The luminous ammeter-voltmeter as claimed in claim 1, wherein said refractory areas are separately marked with respective readable indicia for showing the quantity of electric power according to the illumination of each of said refractory areas.

3. The luminous ammeter-voltmeter as claimed in claim 1, wherein said refractor is a planar piece centered with and spaced from said light bulb to extend equally in its own plane in all directions from said light bulb, and said refractory areas being concentric ring areas centered with the central axis of said light bulb.

4. The luminous ammeter-voltmeter as claimed in claim 3, wherein said concentric ring areas are stepped ring sections on the surface of said refractor adjacent said light bulb, and with said stepped ring sections being annular surfaces disposed at least approximately transverse to the light rays emanating from said light bulb.

5. The luminous ammeter-voltmeter as claimed in claim 4, wherein said concentric ring areas are separately marked with respective readable indicia for showing the quantity of electric power according to the illumination of each of said concentric ring areas.

6. The luminous ammeter-voltmeter as claimed in claim 1, wherein said electric circuit is the type employed in vehicles and includes the elements of an electric battery and a means for generating electric power and an electric power regulator, and with said light bulb and said refractor being operatively related to said electric circuit for serving as a gauge to indicate the quantity of electric power in said circuit and according to the electrical activity of said elements.

7. The luminous ammeter-voltmeter as claimed in claim 4, wherein the central portion of said refractor is circular and has a concave surface faced toward said light bulb for receiving light rays emanating from said light bulb and thereby indicating to an observer a quantity of electric power in said circuit that is lower than that indicated by illumination of any one of said ring sections.

8. The luminous ammeter-voltmeter as claimed in claim 4, wherein said annular surfaces of said ring sections are parallel to each other to thereby produce visibly distinguishable focusing of the respective said light rays falling on said annular surfaces.

* * * * *